(12) United States Patent
Wang et al.

(10) Patent No.: US 7,169,237 B2
(45) Date of Patent: Jan. 30, 2007

(54) STABILIZATION OF ALKALINE HYDROGEN PEROXIDE

(75) Inventors: Xue Wang, King of Prussia, PA (US); Keith Robert Genco, Phoenixville, PA (US)

(73) Assignee: Arkema Inc., Philadelphia, PA (US)

( * ) Notice: Subject to any disclaimer, the term of this patent is extended or adjusted under 35 U.S.C. 154(b) by 86 days.

(21) Appl. No.: 10/820,981

(22) Filed: Apr. 8, 2004

(65) Prior Publication Data

US 2005/0226800 A1 Oct. 13, 2005

(51) Int. Cl.
C01B 15/037 (2006.01)
B08B 3/08 (2006.01)
C11D 7/18 (2006.01)

(52) U.S. Cl. .................. 134/42; 252/186.29; 423/272; 423/273; 510/375

(58) Field of Classification Search ................. 423/272, 423/273; 252/186.29; 134/42; 510/375
See application file for complete search history.

(56) References Cited

U.S. PATENT DOCUMENTS

| | | | |
|---|---|---|---|
| 2,782,100 A | 2/1957 | Greenspan | |
| 3,122,417 A * | 2/1964 | Bruno et al. | 423/272 |
| 3,383,174 A * | 5/1968 | Carnine et al. | 423/273 |
| 3,387,939 A | 6/1968 | Reilly | |
| 3,681,022 A | 8/1972 | Kibbel | |
| 3,781,409 A * | 12/1973 | Munday et al. | 423/273 |
| 4,061,721 A * | 12/1977 | Strong | 423/272 |
| 4,070,442 A * | 1/1978 | Watts | 423/272 |
| 4,294,575 A | 10/1981 | Kowalski | |
| 4,304,762 A * | 12/1981 | Leigh | 423/272 |
| 4,525,291 A | 6/1985 | Smith | |
| 4,552,668 A | 11/1985 | Brown | |
| 4,552,675 A | 11/1985 | Brown | |
| 4,981,662 A * | 1/1991 | Dougherty | 423/272 |
| 5,078,672 A * | 1/1992 | Dougherty et al. | 494/37 |
| 5,102,575 A | 4/1992 | Lanniel | |
| 5,130,053 A * | 7/1992 | Feasey et al. | 252/400.22 |
| 5,217,710 A | 6/1993 | Williams | |
| 5,302,311 A * | 4/1994 | Sugihara et al. | 510/175 |
| 5,372,802 A | 12/1994 | Barrows | |
| 5,733,474 A | 3/1998 | Kagermeier | |
| 5,736,497 A | 4/1998 | Steiner | |
| 5,736,498 A * | 4/1998 | Gray | 510/372 |
| 5,997,764 A | 12/1999 | Ambuter | |
| 6,083,422 A | 7/2000 | Ambuter | |
| 6,495,501 B1 | 12/2002 | Del Duca | |
| 6,536,628 B2 | 3/2003 | Montgomery | |
| 6,576,213 B1 * | 6/2003 | Falgen et al. | 423/478 |
| 2002/0114757 A1 | 8/2002 | Tenney | |
| 2003/0073150 A1 | 4/2003 | Woerner | |

FOREIGN PATENT DOCUMENTS

| | | | |
|---|---|---|---|
| EP | 0 376 704 A1 | | 7/1990 |
| EP | 0426949 A1 | * | 5/1991 |
| JP | 04349109 A | * | 12/1992 |
| WO | 9109807 A2 | * | 7/1991 |
| WO | WO 92/19287 A1 | | 11/1992 |
| WO | WO 93/22273 A1 | | 11/1993 |
| WO | WO 96/09983 | | 4/1996 |
| WO | WO 99/18180 A1 | | 4/1999 |

* cited by examiner

*Primary Examiner*—Wayne A. Langel
(74) *Attorney, Agent, or Firm*—Steven D. Boyd

(57) ABSTRACT

A stabilized basic aqueous hydrogen peroxide composition is disclosed. The composition contains about 0.3 wt % to about 15 wt % of hydrogen peroxide; water; and a stabilizer system that contains about 10 ppm to about 1% of a stannate stabilizer; 10 ppm to about 1% of a phosphonic acid chelating agent or a mixture of phosphonic acid chelating agents; and 10 ppm to about 1% of an aromatic chelating agent or a mixture of aromatic chelating agents. The composition comprises less than about 10 ppm pyrophosphate, preferably no pyrophosphate; and has a pH greater than 7.0, preferably about 8.0 to about 10.5.

29 Claims, No Drawings

STABILIZATION OF ALKALINE HYDROGEN PEROXIDE

FIELD OF THE INVENTION

This invention relates to stabilization of hydrogen peroxide. In particular, this invention relates aqueous alkaline compositions comprising hydrogen peroxide stabilized with a stabilizer system comprising at least one phosphonic acid chelating agent, at least one aromatic chelating agent, and a stannate stabilizer.

BACKGROUND OF THE INVENTION

To avoid the disadvantages inherent in the use of hypochlorite solutions in household laundry bleach, disinfectants, hard surface cleansers, and other cleaning compositions, manufacturers of these products have developed alternatives based on acidic aqueous hydrogen peroxide compositions. Hydrogen peroxide is generally acceptable from a toxicological and environmental standpoint because its decomposition products are oxygen and water. In addition, these compositions are also fiber-safe and color-safe.

Decomposition of hydrogen peroxide caused by catalytically active substances, such as metal ions, is extremely difficult to prevent. For products that contain hydrogen peroxide to be effective, a substantial proportion of the hydrogen peroxide must survive between manufacture and use. In addition, decomposition produces oxygen gas, which could overpressure the container and cause it to rupture during storage or shipping. Therefore, these compositions typically contain stabilizers to prevent decomposition of the hydrogen peroxide. For example, tin compounds, such as sodium stannate, and phosphorus based chelating agent, have been used as stabilizers for acidic compositions (i.e., those with a pH less than about 5).

Because an alkaline environment is normally required for cleaning efficiency, the performance of hydrogen peroxide containing cleaning compositions can be improved by formulating alkaline products. However, the commercial use of alkaline formulations has been hindered by the strong tendency of alkaline hydrogen peroxide compositions to decompose during storage. In addition, under typical storage conditions, decomposition may produce hydroxide ions, which increase the pH and, thus, further increase the decomposition rate. With excessive decomposition of the hydrogen peroxide, the composition loses its cleaning ability.

Various stabilizers have been developed to improve the stability of aqueous alkaline hydrogen peroxide compositions. These are disclosed, for example, in Woerner, U.S. Pat. Pub. 2003/0073150 A1; Steiner, U.S. Pat. No. 5,736,497; Lanniel, U.S. Pat. No. 5,102,575; Smith, U.S. Pat. No.4,525,291; and Kowalski, U.S. Pat. No. 4,294,575. However, these stabilizers are not totally satisfactory. Thus, a need exists for aqueous alkaline hydrogen peroxide compositions with increased stability.

SUMMARY OF THE INVENTION

In one aspect, the invention is a stabilized basic aqueous hydrogen peroxide composition. The composition comprises:
a) about 0.3 wt % to about 15 wt % of hydrogen peroxide;
b) water; and
c) a stabilizer system comprising:
  i) about 10 ppm by weight to about 1 wt % of a stannate stabilizer;
  ii) about 10 ppm by weight to about 1 wt % of a phosphonic acid chelating agent or a mixture of phosphonic acid chelating agents; and
  iii) about 10 ppm by weight to about 1 wt % of an aromatic chelating agent or a mixture of aromatic chelating agents;

in which:
the composition comprises less than about 10 ppm of pyrophosphate; and
the composition has a pH greater than 7.0.

In one embodiment, the composition comprise about 1 wt % to about 15 wt % of hydrogen peroxide, about 40 ppm by weight to about 1 wt % of the phosphonic acid chelating agent or agents, and abut 10 ppm by weight to about 1 wt % of the aromatic chelating agent or agents. The composition is preferably pyrophosphate free. Aqueous hydrogen peroxide compositions that comprise the three component stabilizer system, and less than 10 ppm pyrophosphates, are storage stable at a pH greater than 7, and particularly at a pH of about 9.0 to about 9.5 or above, even in the presence metal ions, such as Fe(II).

DETAILED DESCRIPTION OF THE INVENTION

Unless otherwise indicated, the terms phosphonic acid chelating agent, aromatic chelating agent, stannate stabilizer, surfactant, thickening agent, pyrophosphate, aqueous base, and similar terms also include mixtures of such materials. Unless otherwise specified, all percentages are percentages by weight, all parts per million (ppm) are parts per million by weight, and all temperatures are in degrees Centigrade (Celsius).

The invention is a stabilized basic aqueous hydrogen peroxide composition and a method of cleaning a surface using the composition. The composition comprises hydrogen peroxide, water, and a stabilizer system made up of three components: a phosphonic acid chelating agent, a stannate stabilizer, and an aromatic chelating compound. Mixtures of each of these components may be used instead of a single component. If the stabilized basic aqueous hydrogen peroxide composition is to be used as a cleaning composition, other ingredients that are conventional components of cleaning compositions, such as surfactants, are present.

The stabilized basic aqueous hydrogen peroxide composition comprises at least one phosphonic acid chelating agent. Phosphonic acid chelating agents include, for example, compounds of the general structure $N(CR^1R^2PO_3H_2)_3$, in which $R^1$ and $R^2$ are each independently hydrogen or an alkyl group of one to four carbon atoms, such as amino tri(methylene phosphonic acid) (ATMP) (DEQUEST® 2000, Solutia, St. Louis, Mo., USA), in which $R^1$ and $R^2$ are each hydrogen; diethylene triamine penta(methylene phosphonic acid) (DTPA) (DEQUEST® 2066); hexamethylene diamine tetra(methylene phosphonic acid) (DEQUEST® 2054); bis hexamethylene triamine penta methylene phosphonic acid (DEQUEST® 2090); and compounds of the general structure $C(R^3)(PO_3H_2)_2OH$, in which $R^3$ is hydrogen or an alkyl group of one to four carbon atoms, such as 1-hydroxyethylidene-1,1-diphosphonic acid (HEDP) (DEQUEST® 2010) $(C(CH_3)(PO_3H_2)_2OH)$. Preferred phosphorus-based chelating agents include 1-hydroxyethylidene-1,1-diphosphonic acid, amino tri(methylene phosphonic acid), and diethylene triamine penta (methylene phosphonic acid).

The stabilized basic aqueous hydrogen peroxide composition comprises a stannate stabilizer. The stannate stabilizer may be formed in situ from hydrolysis of a tin compound, such as tin sulfate, sodium stannate ($Na_2SnO_3 \cdot 3(H_2O)$), tin dichloride, or tin tetrachloride. Although the stannate stabilizer is believed to be colloidal stannic oxide, it is typically referred to as colloidal sodium stannate.

The stabilized basic aqueous hydrogen peroxide composition comprises at least one aromatic chelating compound. While not being bound by any theory of explanation, it is believed that this compound functions as a radical scavenger.

The aromatic structure includes carbocyclic aromatic rings, such as the benzene or naphthalene ring, as well as heteroaromatic rings such as pyridine and quinoline. The stabilizer should also contain chelating groups, such as hydroxyl, carboxyl, phosphonate, or sulfonate.

The aromatic chelating compound may be, for example, salicylic acid; a substituted salicylic acid, such as 3-methylsalicylic acid, 4-methyl salicylic acid, 5-methyl salicylic acid, 6-methyl salicylic acid, 3,5-dimethyl salicylic acid, 3-ethyl salicylic acid, 3-iso-propyl salicylic acid, 3-methoxy salicylic acid, 4-methoxy salicylic acid, 5-methyoxy salicylic acid, 6-methoxy salicylic acid, 4-ethoxy salicylic acid, 5-ethyoxy salicylic acid, 2-chloro salicylic acid, 3-chloro salicylic acid, 4-chloro salicylic acid, 5-choloro salicylic acid, 3,5-dichloro salicylic acid, 4-fluoro salicylic acid, 5-fluoro salicylic acid, 6-fluoro salicylic acid; or a mixture thereof. The aromatic chelating compound may be, for example, 8-hydroxy-quinoline; a substituted 8-hydroxy-quinoline, such as, 5-methyl-8-hydroxy-quinoline, 5-methoxy-8-hydroxy-quinoline, 5-chloro-8-hydroxy-quinoline, 5,7-dichloro-8-hydroxy-quinoline, 8-hydroxy-quinoline-5-sulfonic acid, or a mixture thereof. The aromatic chelating compound may be, for example, a pyridine-2-carboxylic acid, such as picolinic acid (2-pyridinecarboxylic aid); dipicolinic acid (2,6-pyridinedicarbxylic acid); 6-hydroxy-picolinic acid; a substituted 6-hydroxy-picolinic acid, such as 3-methyl-6-hydroxy-picolinic acid, 3-methoxy-6-hydroxy-picolinic acid, 3-chloro-6-hydroxy-picolinic acid, 3,5-dichloro-6-hydroxy-picolinic acid; or a mixture thereof. Preferred aromatic chelating compounds include, salicylic acid, 6-hydroxy-picolinic acid, and 8-hydroxy-quinoline.

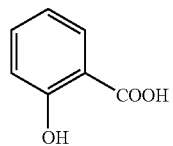
salicylic acid

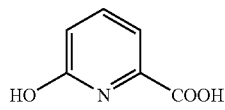
6-hydroxy-picolinic acid

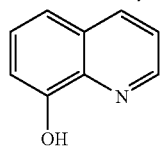
8-hydroxy-quinoline

The stabilizer system comprises about 10 ppm to about 1 wt %, preferably about 15 ppm to about 2500 ppm (0.25 wt %), more preferably about 20 ppm to about 1000 ppm (0.1 wt %), even more preferably about 50 ppm to about 500 ppm, of the stannate stabilizer. The stabilizer system comprises about 10 ppm to about 1 wt %, preferably about 15 ppm to about 2500 ppm (0.25 wt %), more preferably about 20 ppm to about 1000 ppm (0.1 wt %), even more preferably about 40 ppm to about 500 ppm, of the phosphonic acid chelating agent or, if more than one phosphonic acid chelating agent is used, of the mixture of phosphonic acid chelating agents. The stabilizer system comprises about 10 ppm to about 1 wt %, preferably about 15 ppm to about 2500 ppm (0.25 wt %), more preferably about 20 ppm about to 1000 ppm (0.1 wt %) of the aromatic chelating agent or, if more than one chelating agent is used, of the mixture of chelating agents. In one embodiment, the stabilized system comprises about 30 ppm to about 300 ppm, typically 60 ppm to 200 ppm, of each of three components. Typically, the upper limit will be determined by economics and by the degree of stabilization required.

As will be apparent to those skilled in the art, in basic solution one or more of these components may be present as its corresponding anion or anions, or as an equilibrium mixture of the component and its corresponding anion or anions. Anions of these components and mixtures of these components and their corresponding anions are included in the definition of each of these components, and compositions that comprise the corresponding anion or anions are within the scope of the claims.

It has been found that pyrophosphates, commonly used in hydrogen peroxide stabilization, actually destabilize hydrogen peroxide under the alkaline conditions. Therefore, the stabilized basic aqueous hydrogen peroxide compositions are preferably pyrophosphate free.

The composition is preferably prepared from hydrogen peroxide to which no pyrophosphate has been added. However, as will be apparent to those skilled in the art, low levels of pyrophosphate may have been added to concentrated hydrogen peroxide by the manufacturer. This low level of pyrophosphate will be present in the concentrated hydrogen peroxide when the stabilized basic aqueous hydrogen peroxide is prepared. However, no additional pyrophosphate is added when the stabilized basic aqueous hydrogen peroxide is prepared. Although the stabilized basic aqueous hydrogen peroxide preferably comprises less than about 1 ppm of pyrophosphate, and more preferably does not contain any pyrophosphate, up to about 10 ppm of pyrophosphate may be present because of pyrophosphate added by the manufacturer of the hydrogen peroxide.

The pH of the stabilized basic aqueous hydrogen peroxide composition is greater than 7.0, and typically about 8.0 to about 10.5, more typically about 8.5 to about 10.0. Preferably, the pH is greater than about 9.0, more preferably about 9.0 to about 9.5. Although a buffer, such as a borate buffer, may be included to maintain pH at the desired value, this may not be necessary in all cases.

Because aqueous hydrogen peroxide compositions are typically acidic, it is necessary to add base, such as aqueous sodium hydroxide or aqueous potassium hydroxide, to the composition until the desired pH is attained. Aqueous sodium hydroxide is preferred. The base should be free from metal ions that would catalyze decomposition of hydrogen peroxide, such as ferrous ions, ferric ions, cupric ions, cuprous ions, manganous ions, and similar transition metal ions. The base should also be free from both organic and inorganic materials that would react with the hydrogen peroxide.

The stabilized basic aqueous hydrogen peroxide composition typically comprises about 0.3 wt % to about 15 wt %, typically about 1 wt % to about 10 wt %, more typically about 2 wt % to about 8 wt %, even more typically about 3 wt % to about 5 wt %, of hydrogen peroxide. Hydrogen peroxide ($H_2O_2$) is commercially available, and its preparation has been described in numerous patents and publication. The anthraquinone process (also called the autoxidation process or the Riedl-Pfleiderer process) is described, for example, in Riedl, U.S. Pat. No. 2,158,525, and in the *Kirk-Othmer Encyclopedia of Chemical Technology*, 3rd. ed., Volume 13, Wiley, N.Y., 1981, pp. 15–22.

After all the other ingredients have been accounted for, water comprises the balance of the stabilized basic hydrogen peroxide composition. Because hydrogen peroxide is typically commercially available as a 30 wt % to 70 wt % aqueous solution, it is typically necessary to dilute the hydrogen peroxide with water to obtain the desired hydrogen peroxide concentration. The water should be free from metal ions that would catalyze decomposition of hydrogen peroxide, such as ferrous ions, ferric ions, cupric ions, cuprous ions, manganous ions, and similar transition metal ions. The water should also be free from organic material that would be oxidized by hydrogen peroxide. The water should also be free of inorganic materials that would react with hydrogen peroxide, such as chlorine ($Cl_2$), hypochlorous acid (HOCl), and sodium hypochlorite (NaOCl). Distilled or deionized water is preferred.

The stabilized basic aqueous hydrogen peroxide composition may be prepared by adding the desired amount of each of the stabilizers to an aqueous hydrogen peroxide solution containing the desired amount of stabilizer, before or after the addition of aqueous base. As will be apparent to those skilled in the art, if aqueous base is added after the addition of the stabilizers, the concentration of hydrogen peroxide and of each of the stabilizers before addition of the aqueous base must be slightly higher than desired because the aqueous base will dilute the stabilized hydrogen peroxide solution.

Alternatively, the stabilizers can be added to concentrated hydrogen peroxide, such as, for example to 50 wt % aqueous hydrogen peroxide, and the resulting solution diluted to the desired concentration and the pH adjusted to the desired pH by the addition of water and/or aqueous base. The stabilizers can be added, for example, by a manufacturer, and the resulting stabilized concentrated hydrogen peroxide, or concentrate, shipped to a customer, who dilutes the concentrate and, if necessary, adds the required amount of aqueous base to form a stabilized basic aqueous hydrogen peroxide composition with the desired hydrogen peroxide concentration, the desired concentration of each of the stabilizers, and the desired pH. The concentrate might comprise, for example, about 30 wt % to about 70 wt % hydrogen peroxide, about 100 ppm by weight to about 3 wt % of the stannate stabilizer; about 100 ppm by weight to about 1.5 wt % of the phosphonic acid chelating agent or the mixture of phosphonic acid chelating agents; and about 100 ppm by weight to about 1.5 wt % of the aromatic chelating agent or a mixture of aromatic chelating agents. A typical concentrate might comprise: about 50 wt % hydrogen peroxide; about 3000 ppm of the stannate stabilizer; about 1500 ppm of the phosphonic acid chelating agent or the mixture of phosphonic acid chelating agents, such as diethylene triamine penta(methylene phosphonic acid), amino tri(methylene phosphonic acid); and/or 1-hydroxyethylidene-1,1-diphosphonic acid; about 1500 ppm of the aromatic chelating agent or a mixture of aromatic chelating agent, such as salicylic acid and/or 8-hydroxyquinolne.

One application of the stabilized basic aqueous hydrogen peroxide composition is as a cleaning composition. If the stabilized basic aqueous hydrogen peroxide composition is to be used as a cleaning composition, it may comprise other components that are conventional ingredients in cleaning compositions. The stabilizer can stabilize basic aqueous hydrogen peroxide either in the presence of or in the absence of a surfactant.

The composition may also comprise a surfactant or a mixture of surfactants. Numerous surfactants useful in cleaning compositions are well known. Surfactants are well known to those skilled in the art and are described, for example, in *McCutcheon's Detergents and Emulsifiers*, Manufacturing Confectioners Publishing Company, Glen Rock, N.J., and in *Encyclopedia of Surfactants*, Volumes I–III, Compiled by M. and I. Ash, Chemical Publishing Co., NY. Surfactants useful in cleaning compositions are disclosed in, for example, Gosselink, U.S. Pat. No. 4,702,857, especially column 17, line 27, to column 22, line 19, and Laughlin, U.S. Pat. No.3,929,678, especially column 5, line 65, to column 36, line 30. The concentration of surfactant is typically about 0.25 wt % to about 25 wt %, more typically about 1.0 wt % to 15 wt %, of the composition.

Nonionic surfactants are typically condensation products of a hydrophobic organic aliphatic compound, such as a long chain aliphatic alcohol, and hydrophilic ethylene oxide and/or propylene oxide. The length of the resulting polyether chain can be adjusted to achieve the desired balance between the hydrophobic and hydrophilic properties. Nonionic surfactants include, for example, ethoxylated and propoxylated alcohols, especially $C_{10-20}$ alcohols, with 2 to 100 moles of ethylene oxide and/or propylene oxide per mole of alcohol, especially ethoxylates of primary alcohols containing about 8 to 18 carbon atoms in a straight or branched chain configuration with about 5 to 30 moles of ethylene oxide, for example, the ethoxylates of decyl alcohol, cetyl alcohol, lauryl alcohol, or myristyl alcohol; ethoxylates of secondary aliphatic alcohols containing 8 to 18 carbon atoms in a straight or branched chain configuration with 5 to 30 moles of ethylene oxide; condensation of aliphatic alcohols containing about 8 to abut 20 carbon atoms with ethylene oxide and propylene oxide; polyethylene glycol and polyethylene oxide; ethoxylated castor oil; ethoxylated hydrogenated castor oil; ethoxylated coconut oil; ethoxylated lanolin; ethoxylated tall oil; ethoxylated tallow alcohol; and ethoxylates of sorbitan esters. Examples of anionic surfactants are sulfates and sulfates of ethoxylates, sodium cetyl sulfate, sodium lauryl sulfate, sodium myristyl sulfate, and sodium stearyl sulfate, sodium dodecylbenzene sulfonate, and sodium polyoxyethylene lauryl ether sulfate.

The cleaning composition may comprise a thickening agent, which is stable to oxidation under alkaline conditions, which helps control dispensing of the composition and retards drainage from surfaces to which it is applied. Thickening agents may be organic or inorganic. Inorganic thickening agents include alkali metal silicates and very high surface area inorganic materials, such as finely divided silica or clays. Organic thickening agents include cellulose ethers, such as methylcellulose; acrylic and methacrylic polymers and copolymers, such as copolymers of acrylic acid; and biopolymers, such as alginate. Polymer-based products, such as polyacrylic acid copolymers are preferred. Although the concentration of the thickening agent will depend on the viscosity desired, the nature of the thickening agent, and the nature and concentration of other materials present in the composition, if any, when present, the thickening agent typically comprises about 0.25 wt % to about 3.0 wt % of the cleaning composition.

Other conventional ingredients may be included, provided each ingredient is compatible with the other ingredients of cleaning composition and the presence of the ingredient does not adversely affect the properties of the cleaning composition. Each additional ingredient is used to modify the cleaning composition in conventional form and is present in an effective amount, that is, in the amount required to achieve the desired effect without adversely affecting the properties of the composition. Cleaning compositions may also comprise a perfumes and fragrances, typically at about 0.03 wt % to about 1.0 wt % of the composition. Fluorescent whitening agents may also be present, typically at about 0.1 wt % to 1.0 wt %. An anti-redeposition agent, such as, polyvinyl pyrrolidone, hydroxyethyl cellulose, sodium carboxymethyl cellulose, and hydroxypropyl ethyl cellulose may be present. A filler salt, such as sodium sulfate or sodium chloride, may be present. Other conventional ingredients include: dyes and other colorants; fabric softening compositions; static control agents; optical opacifiers, such as polystyrene particles; and suds regulants, such as dimethylpolysiloxane.

INDUSTRIAL APPLICABILITY

Aqueous alkaline hydrogen peroxide compositions are used in hair care, as household laundry bleaches, and as disinfectant compositions. When a surfactant is present, basic hydrogen peroxide compositions may be used as cleaning compositions, especially as hard surface cleaners such as toilet bowl cleaners. When uses as hard surface cleaners, they may be sprayed or wiped onto the surface, and then wiped off the surface or rinsed off the surface with water. Liquid toilet bowl cleaners, for example, may be squirted from a squeezable container or bottle, left to slowly coat the bowl surface through gravitational pull and clean over several hours. Alternatively, brush may be used to scrub the surface and the dirt. The grime and the cleaner are then flushed away.

The advantageous properties of this invention can be observed by reference to the following examples, which illustrate but do not limit the invention.

EXAMPLES

Glossary

HEDP 1-Hydroxyethylidene-1,1-diphosphonic acid, DEQUEST® 2010 (Solutia, St. Louis, Mo., USA)
Sal Salicylic acid (o-hydroxybenzoic acid) (Aldrich, Milwaukee, Wis., USA)
Stannate (Sn) Sodium stannate, $Na_2SnO_3.3H_2O$ (Aldrich, Milwaukee, Wis., USA)
P1 Diethylene triamine penta(methylene phosphonic acid), DEQUEST® 2066 (DTPA) (Solutia, St. Louis, Mo., USA)
P2 Amino tri(methylene phosphonic acid), DEQUEST® 2000 (ATMP) (Solutia, St. Louis, Mo., USA)
Pyrophosphate $Na_2H_2P_2O_7$ (Sigma, St. Louis, Mo., USA)
Q 8-Hydroxy-quinoline (Aldrich, Milwaukee, Wis., USA)

Example 1

This example illustrates the stability of aqueous hydrogen peroxide compositions in the presence of a metal impurity. Hydrogen peroxide is unstable in the presence of metal ions. Measurement of the stability of hydrogen peroxide in the presence of metal ions, in particular in the presence of Fe(II), indicates which compositions will perform in cosmetic and cleaning applications.

Examples 1-A to 1-F, each containing 3 wt % aqueous hydrogen peroxide, were prepared. The ingredients added to each sample are listed Table 1. In each example that contains stannate, the stannate concentration was 90 ppm. In each example that contains the phosphonic acid chelating agent, the phosphonic acid chelating agent concentration was 45 ppm. In each example that contains salicylic acid, the salicylic acid concentration is 50 ppm. The pH was adjusted to pH 9 with aqueous sodium hydroxide. Each sample was spiked with 1 ppm Fe(II) and stored 85° C. for 24 hours. The amount of hydrogen peroxide in each sample was measured by titration with potassium permanganate.

The amount of hydrogen peroxide lost is the difference between the initial concentration of hydrogen peroxide and the concentration of hydrogen peroxide after 24 hours, divided by the initial concentration of hydrogen peroxide.

TABLE 1[a]

| Example # | Additives | Peroxide lost (%) |
| --- | --- | --- |
| 1-A | Sn | 13.2 |
| 1-B | P1 | 100.0 |
| 1-C | Sal | 100.0 |
| 1-D | Sn, P1 | 14.2 |
| 1-E | Sn, Sal | 15.6 |
| 1-F | Sn, P1, Sal | 9.8 |

[a]Each sample initially contained 3 wt % hydrogen peroxide. 1 ppm of Fe(II) was added to each sample.

Sample 1-A, 1-B, and 1-C each contain only one of the three components of the stabilizer. Examples 1-D and 1-E each contain two of the three components. Sample 1-F contains all three components. The combination of all three components performs better than any individual ingredient and better than any of the combinations of two ingredients tested. Greater than 90% of the hydrogen peroxide was retained under the conditions of the evaluation.

Example 2

This example illustrates the stability of aqueous hydrogen peroxide compositions in the presence of different concentration of Sn stabilizer. The procedure of Example 1 was repeated, with 1 ppm Fe(II) were added. The ingredients added and the results are show in Table 2.

TABLE 2[a]

| Example # | Additive (ppm) | Peroxide lost (%) |
| --- | --- | --- |
| 1-A | Sn (90) | 13.2 |
| 2-A | Sn (300) | 11.4 |
| 1-F | Sn (90), P1 (45), Sal (50) | 9.8 |

[a]Each sample initially contained 3 wt % hydrogen peroxide. 1 ppm of Fe(II) was added to each sample.

This example shows that 300 ppm stannate stabilizer (Sn) alone is not as effective as the combination of 90 ppm stannate stabilizer (Sn), 45 ppm of diethylene triamine penta(methylene phosphonic acid) (P1), and 50 ppm of salicylic acid (Sal) in stabilizing hydrogen peroxide under alkaline conditions.

Example 3

This example illustrates the stability of hydrogen peroxide in the presence of different level of metal impurities. The procedure of Example 1 was repeated, except that the different concentrations of Fe(II) were added. The ingredients added and the results are show in Table 3. The stabilizer concentrations were as in Example 1.

TABLE 3[a]

| Example # | Additive | Fe(II) (ppm) | | | |
|---|---|---|---|---|---|
| | | 0 ppm | 0.02 ppm | 0.2 ppm | 1 ppm |
| | | Peroxide lost (%) | | | |
| 3-A | Sn | 13.9 | 11.5 | 12.2 | 13.2 |
| 3-B | Sn, Sal | 12.5 | 13.9 | 14.9 | 15.6 |
| 1-D | Sn, P1 | ND | ND | ND | 14.2 |
| 3-C | Sn, P1, Sal | 17.7 | 10.8 | 10.5 | 9.8 |

[a]Each sample initially contained 3 wt % hydrogen peroxide.
ND = Not determined.

In the presence of Fe(II), the combination of all three components is more effective than sodium stannate (Sn) or the combination of sodium stannate (Sn) and salicylic acid (Sal).

Example 4

This example illustrates the stability of hydrogen peroxide in the presence of disodium pyrophosphate ($Na_2H_2P_2O_7$). Aqueous basic (pH of 9.5) hydrogen peroxide compositions containing about 5 wt % hydrogen peroxide and different levels of stannate and/or disodium pyrophosphate were stored at 96° C. for 16 hours and the amount of peroxide remaining analyzed as in Example 1. The results are shown in Table 4.

TABLE 4

| Example number | Stannate (ppm) | $Na_2H_2P_2O_7$ (ppm) | Start Conc (wt %) | End Conc (wt %) | Peroxide lost (%) |
|---|---|---|---|---|---|
| 4-A | 100 | 0 | 4.98 | 3.61 | 27.5 |
| 4-B | 300 | 100 | 4.95 | 1.35 | 72.7 |
| 4-C | 100 | 300 | 4.95 | 1.26 | 74.5 |
| 4-D | 0 | 400 | 4.95 | 0 | 100.0 |

These examples show that the stability of hydrogen peroxide decreases when a pyrophosphate is present.

Example 5

This example illustrates stability of hydrogen peroxide in the presence of a surfactant. A composition containing 3 wt % hydrogen peroxide, 1 wt % amine oxide surfactant, and a stabilizer system containing 90 ppm stannate, 45 ppm HEDP, and 50 ppm salicylic acid, and was adjusted to a pH of 9 and stored at 85° C. After 24 hours, the composition was analyzed for hydrogen peroxide as in Example 1. 86.8% of the hydrogen peroxide was retained.

Example 6

Examples 6-A to 6-E each initially contained 3 wt % hydrogen peroxide. The concentration of each additive is 100 ppm. Following the procedure of Example 1, each sample was spiked with 1 ppm Fe(II), stored at pH 9, 85° C. for 24 hours, and analyzed for hydrogen peroxide. The results are given in Table 5.

TABLE 5[a]

| Sample # | Additives | Peroxide lost (%) |
|---|---|---|
| 6-A | Sn | 13.2 |
| 6-B | P2 | 100.0 |
| 6-C | Q | 99.9 |
| 6-D | Sn, P2 | 13.4 |
| 6-E | Sn, P2, Q | 10.2 |

[a]Each sample initially contained 3 wt % hydrogen peroxide. All additive concentrations were 100 ppm unless otherwise indicated.

Having described the invention, we now claim the following and their equivalents.

What is claimed is:

1. A composition comprising:
   a) about 0.3 wt % to about 15 wt % of hydrogen peroxide;
   b) water; and
   c) a stabilizer system comprising:
      i) about 10 ppm by weight to about 1 wt % of a stannate stabilizer;
      ii) about 10 ppm by weight to about 1 wt % of a phosphonic acid chelating agent or a mixture of phosphonic acid chelating agents; and
      iii) about 10 ppm by weight to about 1 wt % of an aromatic chelating agent or a mixture of aromatic chelating agents;
   wherein;
   the composition comprises less than 1 ppm of pyrophosphate; and
   the composition has a pH greater than 7.0.

2. The composition of claim 1 in which the composition has a pH of about 8.0 to about 10.5.

3. The composition of claim 1 in which the stabilizer system comprises about 15 ppm to about 2500 ppm of the stannate stabilizer, about 15 ppm to about 2500 ppm of the phosphonic acid chelating agent or the mixture of phosphonic acid chelating agents, and about 15 ppm to about 2500 ppm of the aromatic chelai.ng agent or the mixture of chelating agents.

4. The composition of claim 3 in which:
   the phospbonic acid chelating agent is selected from the group consisting of amino tri(methylene phosphonic acid); diethylene triainine penta(methylene phosphonic acid); hexamethylene diamine tetra(methylene phosphonic acid); bis hexamethylene triamine penta methylene phosphonic acid; 1-hydroxyethylidene-1,1-diphosphonic acid, and mixtures thereof; and
   the aromatic chelating agent is selected from the group consisting of salicylic acid, 6-hydrocy-picolinic acid, 8-hydroxy-quinoline, and mixtures thereof.

5. The composition of claim 4 in which stabilizer system comprises about 20 ppm to about 1000 ppm of the stannate stabilizer, about 20 ppm to about 1000 ppm of the phosphonic acid chelating agent or the mixture of phosphonic acid chelating agents; about 20 ppm about to 1000 ppm of the aromatic chelating agent or the mixture of chelating agents.

6. The composition of claim 5 in which the composition has a pH of 9.0 to 9.5.

7. The composition of claim 6 in which the stabilizer system comprises about 30 ppm to about 200 ppm of the stannate stabilizer; about 30 ppm to about 200 ppm of the phosphonic acid chelating agent or mixture of phosphonic acid chelating agents; and about 30 ppm to about 200 ppm of the aromatic chelating agent or mixture of aromatic chelating agents.

8. The composition of claim 7 in which the phosphoinc acid chelating agent is selected from the group consisting of 1-hydroxyethylidene-1,1-diphosphonic acid, amino tri(methylene phosphonic acid), diethylene triamine penta(methylene phosphonic acid), and mixtures thereof; and the aromatic chelating agent is selected from the group consisting of 8-hydroxy-quinoline and salicylic acid.

9. The composition of claim 2 in which:
the phosphonic acid chelating agent is selected from the gxoup consisting of amino tri(methylene phosphonic acid); diethylene triaznine penta(methylene phosphonic acid); hexametbylene diamine teya(methylene phosphonic acid); bis hexamethylene triamine penta methylene phosphonic acid; 1-hydroxyethylidene-1,1-diphosphonic acid, and mixtures thereof; and
the aromatic chelating agent is selected from the group consisting of salicylic acid, 6-hydroxy-picolinic acid, 8-hydroxy-quinoline, and mixtures thereof.

10. The composition of claim 9 in which the composition comprises less than about 1 ppm of pyrophosphate.

11. The composition of claim 1 in which the composition additionally comprises about 0.25 wt % to about 25 wt % of a surfactant or mixture of surfactants.

12. The composition of claim 11 in which the composition has a pH of about 8.0 to about 10.5.

13. The composition of claim 12 in which the stabilizer system comprises about 15 ppm to about 2500 ppm of the stannate stabilizer, about 15 ppm to about 2500 ppm of the phosphonic acid chelating agent or the mixture of phosphonic acid chelating agents, and about 15 ppm to about 2500 ppm of the aromatic chelating agent or the mixture of chelating agents.

14. The composition of claim 13 in which:
the phosphonic acid chelating agent is selected from the group consisting of amino tri(methylene phosphonic acid); diethylene triamine penta(methylene phosphonic acid); hexamethylene diamine tetra(methylene phosphonic acid); bis hexamethylene triamine penta methylene phosphonic acid; 1-hydroxyethylidene-1,1-diphosphonic acid, and mixtures thereof; and
the aromatic chelating agent is selected from the group consisting of salicylic acid, 6-hydroxy-picolinic acid, 8-hydroxy-quinoline, and mixtures thereof.

15. The composition of claim 14 in which stabilizer system comprises about 20 ppm to about 1000 ppm of the stdnnate stabilizer, about 20 ppm to about 1000 ppm of the phosphonic acid chelating agent or the mixture of phosphonic acid chelating agents; about 20 ppm about to 1000 ppm of the aromatic chelating agent or the mixture of chelating agents.

16. The composition of claim 15 in which the composition has a pH of 9.0 to 9.5.

17. The composition of claim 16 in which the stabilizer system comprises about 30 ppm to about 200 ppm of the stannate stabilizer; about 30 ppm to about 200 ppm of the phosphonic acid chelating agent or mixture of phosphonic acid chelating agents; and about 30 ppm to about 200 ppm of the aromatic chelating agent or mixture of aromatic chelating agents.

18. The composition of claim 17 in which the phosphonic acid chelating agent is selected from the group consisting of 1-hydroxyethylidene-1,1-diphosphonic acid, amino tri(methylene phosphonic acid), diethylene triamine penta(methylene phosphonic acid), and mixtures thereof; and the aromatic chelating agent is selected from the group consisting of 8-hydroxy-quinoline and salicylic acid.

19. The composition of claim 18 in which the composition additionally comprises a thickening agent.

20. The composition of claim 12 in which:
the phosphonic acid chelating agent is selected from the group consisting of amino tri(methylene phosphonic acid); diethylene triamine penta(methylene phosphonic acid); hexamethylene diamine tetra(methylene phosphonic acid); bis hexamethylene triamino penta methylene phosphonic acid; 1-hydroxyethylidene-1,1-diphosphonic acid, and mixtures thereof; and
the aromatic chelating agent is selected from the group consisting of salicylic acid, 6-hydroxy-picolinic acid, 8-hydroxy-quinoline, and mixtures thereof.

21. The composition of claim 1 in which the composition exhibits a stability of less than about 10% hydrogen peroxide loss after storage for 24 hours at 85° C.

22. A method of cleaning a surface, the method comprising the steps of:
(1) applying a composition to the surface, the composition comprising:
a) about 0.3 wt % to about 15 wt % of hydrogen peroxide;
b) water;
c) about 0.25 wt % to about 25 wt % of a surfactant or mixture of surfactants;
d) about 0.25 wt % to about 3.0 wt % of a thickening agent or a mixture of thickening agents; and
e) a stabilizer system comprising:
i) about 10 ppm by weight to about 1 wt % of a stannate stabilizer;
ii) about 10 ppm by weight to about 1 wt % of a phosphonic acid chelating agent or a mixture of phosphonic add chelating agents; and
iii) about 10 ppm by weight to about 1 wt % of an aromatic chelating agent or a mixture of aromatic chelating agents;
wherein;
the composition comprises less than 1 ppm pyrophosphate; and
the composition has a pH greater than 7.0; and
(2) removing the composition.

23. The method of claim 22 in which in which
the composition has a pH of about 8.0 to about 10.5;
the composition comprises about 20 ppm to about 1000 ppm of the stannate stabilizer, about 20 ppm to about 1000 ppm of the phosphonic acid chelating agent or the mixture of phosphonic acid chelating agents; about 20 ppm about to 1000 ppm of the aromatic chelating agent or the mixture of chelating agents; and
the phosphonic acid chelating agent is selected from the group consisting of amino tri(methylene phosphonic acid); diethylene triamine penta(methylene phosphonic acid); heinmethylene diamine tetra(methylene phosphonic acid); bis hexamethylene triamine penta methylene phosphonic acid 1-hydroxyerhylidene-1,1-diphosphonic acid, and mixtures thereof; and the aromatic chelating agent is selected from the group consisting of salicylic acid, 6-hydroxy-picolinic acid, 8-hydroxy-quinoline, and mixtures thereof.

24. The method of claim 22 in which the composition exhibits a stability of less than about 10% hydrogen peroxide loss after storage for 24 hours at 85° C.

25. A method of preparing a stabilized basic aqueous hydrogen peroxide composition, the method comprising the steps of:
providing a concentrate comprising about 30% to about 70% hydrogen peroxide, about 100 ppm by weight to about 3 wt % of a stannate stabilizer; about 100 ppm by weight to about 1.5 wt % of a phosphonic acid chelating agent or a mixture of phosphonic acid chelating agents; and about 100 ppm by weight to about 1.5 wt % of an aromatic chelating agent or a mixture of aromatic chelating agents; diluting the concentrate with water, with aqueous base, or with both water and aqueous base to form the stabilized basic aqueous hydrogen peroxide composition;

in which:

the stabilized basic aqueous hydrogen peroxide composition has a pH greater than 7.0, the stabilized basic aqueous hydrogen peroxide composition comprises about 0.3 wt % to about 15 wt % of bydrogen peroxide; and the stabilized basic aqueous hydrogen peroxide composition comprises less than 1 ppm of pyrophosphate.

26. The method of claim 25 in which in which the stabilized basic aqueous hydrogen peroxide composition has a pH of about 8.0 to about 10.5.

27. The method of claim 26 in which the stabilized basic aqueous hydrogen peroxide composition comprises about 20 ppm to about 1000 ppm of the stannate stabilizer, about 20 ppm to about 1000 ppm of the phosphonic acid chelating agent or the mixture of phosphonic acid chelating agents; about 20 ppm about to 1000 ppm of the aromatic chelating agent or the mixture of chelating agents.

28. The method of claim 27 in which:

the phosphonic acid chelating agent is selected from the group consisting of amino tri(methylene phosphonic acid); diethylene triamine penta(methylene phosphonic acid); hexamethylene diamine tetra(methylene phosphonic acid); bis hexamethylene triamine penta methylene phosphonic acid; 1-hydroxyethylidene-1,1-diphosphonic acid, and mixtures thereof; and the aromatic chelating agent is selected from the group consisting of salicylic acid, 6-hydroxy-picolinic acid, 8-hydroxy-quinoline, and mixtures thereof.

29. The method of claim 25 in which the composition exhibits a stability of less than about 10% hydrogen peroxide loss after storage for 24 hours at 85° C.

* * * * *